(12) United States Patent
Woerz et al.

(10) Patent No.: US 8,907,019 B2
(45) Date of Patent: Dec. 9, 2014

(54) POLYPROPYLENE COMPOSITION WITH HIGH ELASTICITY AND TRANSPARENCY

(75) Inventors: Alexander Woerz, Gruenstadt (DE); Mike Freudenstein, Kiedrich (DE); Gerald Lutz, Cologne (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/995,753

(22) PCT Filed: Dec. 19, 2011

(86) PCT No.: PCT/EP2011/073170
§ 371 (c)(1),
(2), (4) Date: Jun. 19, 2013

(87) PCT Pub. No.: WO2012/084768
PCT Pub. Date: Jun. 28, 2012

(65) Prior Publication Data
US 2013/0273291 A1    Oct. 17, 2013

Related U.S. Application Data

(60) Provisional application No. 61/434,246, filed on Jan. 19, 2011.

(30) Foreign Application Priority Data

Dec. 21, 2010 (EP) .................................... 10015928

(51) Int. Cl.
| | | |
|---|---|---|
| C08L 23/10 | (2006.01) |
| B32B 1/00 | (2006.01) |
| B32B 1/02 | (2006.01) |
| C08L 23/14 | (2006.01) |
| B29C 49/00 | (2006.01) |
| B29K 23/00 | (2006.01) |
| B29L 31/00 | (2006.01) |

(52) U.S. Cl.
CPC ........... *C08L 23/142* (2013.01); *B29C 49/0005* (2013.01); *C08L 23/14* (2013.01); *C08L 2205/02* (2013.01); *C08L 2314/06* (2013.01); *B29K 2023/12* (2013.01); *B29L 2031/7148* (2013.01)
USPC ........................ 525/240; 428/35.7; 428/36.92

(58) Field of Classification Search
USPC ............ 428/35.7, 36.6, 36.7, 36.92; 525/191, 525/240, 243, 322, 323
See application file for complete search history.

(56) References Cited

U.S. PATENT DOCUMENTS

| | | |
|---|---|---|
| 2002/0156194 A1 | 10/2002 | Pelliconi et al. |
| 2004/0266952 A1 | 12/2004 | Pelliconi et al. |
| 2007/0155921 A1 | 7/2007 | Fuchs et al. |
| 2009/0306298 A1 | 12/2009 | Cagnani et al. |
| 2010/0234507 A1 | 9/2010 | Pezzutti et al. |

FOREIGN PATENT DOCUMENTS

EP    0597461 A2    5/1994

OTHER PUBLICATIONS

PCT International Search Report & Written Opinion mailed Feb. 17, 2012, for PCT/EP2011/073170.

*Primary Examiner* — Walter B Aughenbaugh

(57) ABSTRACT

A propylene polymer composition comprising (percent by weight referring to the sum of A+B): A) 60%-90% of a crystalline propylene copolymer containing from 1.0% to 5.0% of ethylene derived units; B) 10%-40% of a copolymer of propylene with from 18% to 32% of ethylene derived units, said propylene polymer composition having a melt flow rate value according to ISO 1133 (230° C., 2.16 kg) of from 1.0 to 2.0 g/10 min.

8 Claims, No Drawings

POLYPROPYLENE COMPOSITION WITH HIGH ELASTICITY AND TRANSPARENCY

This application is the U.S. National Phase of PCT International Application PCT/EP2011/073170, filed Dec. 19, 2011, claiming priority of European Patent Application No. 10015928.4, filed Dec. 21, 2010 and the benefit under 35 U.S.C. 119(e) of U.S. Provisional Application No. 61/434,246, filed Jan. 19, 2011, the contents of which are incorporated herein by reference in their entirety.

The present invention relates to a heterophasic polypropylene composition having an optimum balance of properties in view of elasticity and transparency.

Up to now infusion bottles are generally made of LDPE due to a broad processing window in blow molding applications, transparency sufficient for detection of impurities in filling good, softness ideal for collapsible bottles and the highest possible purity, because it can be produced without additives. However, LDPE available up to now suffers from the disadvantage that it allows only a sterilization temperature of 113° C.

As is known, the polypropylene is endowed with a combination of properties which renders it suitable for a very great number of uses. Polypropylene generally resists a higher temperature than LDPE and shows transparency which is even better than that of LDPE, so even slightest impurities could be detected. However, polypropylene known so far shows several disadvantages. Processing window is narrower than for LDPE, additives have to be selected carefully for compliance and therefore may add up to the extractables profile and the polypropylene available so far is too hard for collapsible bottles and even shows post-crystallization.

In WO 01/092406 A1 a propylene polymer composition is described comprising from 70 to 90% by weight of a random copolymer of propylene with ethylene, containing from 1 to 6% by weight of ethylene and from 10 to 30% by weight of a copolymer of propylene with ethylene, containing from 8 to 18% by weight of ethylene. Said composition is said to have a good transparency, however suffers from stiffness.

WO 2006/082144 A1 relates to a propylene polymer composition comprising 75-95% by weight of a copolymer of propylene comprising from 0.3% to 2% by weight of comonomer units derived from ethylene; and 5-25% by weight of a copolymer of propylene comprising from 18 to 35% by weight of ethylene units. Said composition is suitable for the preparation of containers for hot-fill and retortable applications. For achieving a sufficient clarity of the container the heat is supplied by infrared radiation and the composition contains a radiant heat absorbent.

Thus, the object of the present invention is to provide a propylene composition for blow moulded articles which can be sterilized at a temperature of 121° C., are flexible to produce collapsible bottles with low amount of extractables, and have a good clarity without addition of nucleating or clarifying additives as well as articles made of the composition.

The object is achieved by a polypropylene composition comprising (percent by weight):
A) 60-90% by weight, preferably 70-85% by weight, more preferably 75-82% by weight of a crystalline propylene copolymer containing from 1.0 to 5.0% by weight preferably from 1.2 to 3.4% by weight more preferably from 1.5 to 3.0% by weight of ethylene derived units; and
B) 10-40% by weight, preferably 15-30% by weight, more preferably 20-25% by weight of a copolymer of propylene with from 18 to 32% by weight, preferably from 20 to 30% by weight; even more preferably from 22 to 27% by weight of ethylene derived units,
wherein said propylene polymer composition having a melt flow rate value according to ISO 1133 (230° C., 2.16 kg) of from 1.0 to 2.0 g/10 min as well as blow moulded articles made of this composition.

The composition further should have a vicat softening temperature (measured according to DIN EN ISO B50) of >121° C. and a melting temperature Tm (measured by DSC on the as-reactor polymer) of >130° C. The Tm values characterizing the propylene polymers of the invention should be measured on the "as-reactor polymer", i.e. on the polymer as such without adding any additive or filler, in particular without adding nucleating agents.

Moreover, the compositions of the present invention preferably are endowed with some or all these properties:
- a Flexural Modulus is comprised between 800 MPa and 450 MPa;
- a haze measured on 1 mm plaques lower than 40%; preferably lower than 35%; even more preferably lower than 30% without addition of any additives, especially nucleating agents.

The propylene polymer compositions of the present invention can be prepared by sequential polymerization in at least two stages, with each subsequent polymerization stage being conducted in the presence of the polymeric material formed in the immediately preceding polymerization reaction, wherein the copolymer (A) is normally prepared in at least one first polymerization stage and the copolymer (B) is normally prepared in at least one second polymerization stage.

Preferably, each polymerization stage is carried out in presence of a metallocene catalyst. The metallocene suitable for producing the propylene polymer compositions of the invention comprise a solid catalyst component comprising at least one metallocene compound of transition metals of group 3, 4, 5 or 6 of the Periodic Table of the Elements which has two different π-ligands.

Particular preference is given to catalyst systems based on metallocene compounds of the formula (I),

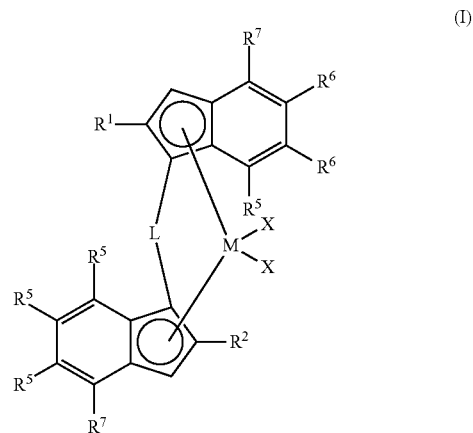

where
M is zirconium, hafnium or titanium, preferably zirconium,
X are identical or different and are each, independently of one another, hydrogen or halogen or an —R, —OR, —OSO$_2$CF$_3$, —OCOR, —SR, —NR$_2$ or —PR$_2$ group, where R is linear or branched C$_1$-C$_{20}$-alkyl, C$_3$-C$_{20}$-cycloalkyl which may be substituted by one or more C$_1$-C$_{10}$- alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, preferably $C_1$-$C_{10}$-alkyl such as methyl, ethyl, n-propyl, isopropyl, n-butyl, isobutyl, sec-butyl, tert-butyl, n-pentyl, n-hexyl, n-heptyl or n-octyl or $C_3$-$C_{20}$-cycloalkyl such as cyclopentyl or cyclohexyl, where the two radicals X may also be joined to one another and preferably form a $C_4$-$C_{40}$-dienyl ligand, in particular a 1,3-dienyl ligand, or an —OR'O— group in which the substituent R' is a divalent group selected from the group consisting of $C_1$-$C_{40}$-alkylidene, $C_6$-$C_{40}$-arylidene, $C_7$-$C_{40}$-alkylarylidene and $C_7$-$C_{40}$-arylalkylidene, where X is preferably a halogen atom or an —R or —OR group or the two radicals X form an —OR'O— group and X is particularly preferably chlorine or methyl, L is a divalent bridging group selected from the group consisting of $C_1$-$C_{20}$-alkylidene radicals, $C_3$-$C_{20}$-cycloalkylidene radicals, $C_6$-$C_{20}$-arylidene radicals, $C_7$-$C_{20}$-alkylarylidene radicals and $C_7$-$C_{20}$-arylalkylidene radicals, which may contain heteroatoms of groups 13-17 of the Periodic Table of the Elements, or a silylidene group having up to 5 silicon atoms, e.g. —SiMe$_2$— or —SiPh$_2$—, where L preferably is a radical selected from the group consisting of —SiMe$_2$—, —SiPh$_2$—, —SiPhMe—, —SiMe(SiMe$_3$)—, —CH$_2$—, —(CH$_2$)$_2$—, —(CH$_2$)$_3$— and —C(CH$_3$)$_2$—, $R^1$ is linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, where $R^1$ is preferably unbranched in the a position and is preferably a linear or branched $C_1$-$C_{10}$-alkyl group which is unbranched in the a position, in particular a linear $C_1$-$C_4$-alkyl group such as methyl, ethyl, n-propyl or n-butyl, $R^2$ is a group of the formula —C(R$^3$)$_2$R$^4$, where $R^3$ are identical or different and are each, independently of one another, linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, or two radicals $R^3$ may be joined to form a saturated or unsaturated $C_3$-$C_{20}$-ring, where $R^3$ is preferably a linear or branched $C_1$-$C_{10}$-alkyl group, and $R^4$ is hydrogen or linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, where $R^4$ is preferably hydrogen, $R^5$ are identical or different and are each, independently of one another, hydrogen or halogen or linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, where $R^5$ is preferably hydrogen or a linear or branched $C_1$-$C_{10}$-alkyl group, in particular a linear $C_1$-$C_4$-alkyl group such as methyl, ethyl, n-propyl or n-butyl, and $R^6$ are identical or different and are each, independently of one another linear or branched $C_1$-$C_{20}$-alkyl, $C_3$-$C_{20}$-cycloalkyl which may be substituted by one or more $C_1$-$C_{10}$- alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, or the two radicals $R^6$ may be joined to form a saturated or unsaturated $C_3$-$C_{20}$ ring, where two $R^6$ preferably are joined to form a saturated $C_3$-$C_{20}$ ring, $R^7$ are identical or different and are each, independently of one another, halogen or linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, where $R^7$ is preferably an aryl group of the formula (II),

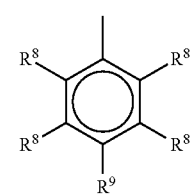

(II)

where $R^8$ are identical or different and are each, independently of one another, hydrogen or halogen or linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, or two radicals $R^8$ may be joined to form a saturated or unsaturated $C_3$-$C_{20}$ ring, where W is preferably a hydrogen atom, and $R^9$ is hydrogen or halogen or linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, where $R^8$ is preferably a branched alkyl group of the formula —C(R$^{10}$)$_3$, where $R^{10}$ are identical or different and are each, independently of one another, a linear or branched $0_1$-$C_6$-alkyl group or two or three of the radicals $R^{10}$ are joined to form one or more ring systems.

More preferably the catalyst systems are based on metallocene compounds of the formula (II),

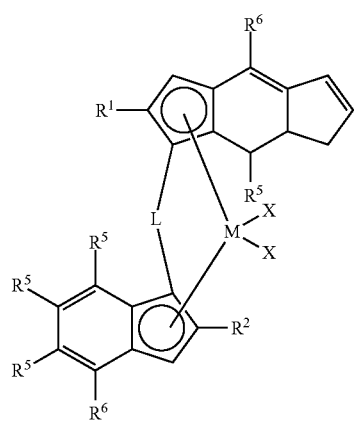

(II)

Particularly useful metallocene compounds and methods of preparing them are described, for example, in WO 01/48034 and the European patent application No. 01204624.9.

It is also possible to use mixtures of various metallocene compounds or mixtures of various catalyst systems. However, preference is given to using only one catalyst system comprising one metallocene compound, which is used for the polymerization of the propylene copolymer A and the propylene copolymer B.

Examples of useful metallocene compounds are dimethylsilanediyl(2-methyl-4-phenyl terahydro-s-indacenyl)(2-isopropyl-4-(4'-tert-butylphenyl)indenyl) zirconium dimethyl, dimethylsilanediyl (2-ethyl-4-(4'-tert-butylphenyl)indenyl)(2-isopropyl-4-(4'-tert-butylphenyl)indenyl) zirconium dichloride, dimethylsilanediyl (2-methyl-4-(4'-tert-butylphenyl)indenyl)(2-isopropyl-4-(1-naphthyl)indenyl) zirconium dichloride, dimethylsilanediyl (2-methyl-4-phenyl-1-indenyl)(2-isopropyl-4-(4'-tert-butylphenyl)-1-indenyl) zirconium dichloride, dimethylsilanediyl (2-isopropyl-4-(4'-tert-butylphenypindenyl)(2-methyl-4,5-benzindenyl) zirconium dichloride, dimethylsilanediyl(2-methyl-4-(4'-tert-butylphenypindenyl)(2-isopropyl-4-(4'-tert-butylphenyl)indenyl) zirconium dichloride, dimethylsilanediyl(2-methyl-4-(4'-tert-butylphenypindenyl)(2-isopropyl-4-phenylindenyl) zirconium dichloride, dimethylsilanediyl(2-ethyl-4-(4'-tert-butylphenypindenyl)(2-isopropyl-4-phenyl)indenyl) zirconium dichloride and dimethylsilanediyl(2-isopropyl-4-(4'-tert-butylphenyl)indenyl)(2-methyl-4-(1-naphthyl)indenyl) zirconium dichloride and mixtures thereof.

Most preferred is a catalyst system comprising dimethylsilanediyl(2-methyl-4-phenyl terahydro-s-indacenyl)(2-isopropyl-4-(4'-tert-butylphenypindenyl) zirconium dimethyl.

The preferred catalyst systems based on metallocene compounds generally further comprise cation-forming compounds as cocatalysts. Suitable cation-forming compounds which are able to react with the metallocene compound to convert it into a cationic compound are, for example, compounds such as an aluminoxane, a strong uncharged Lewis acid, an ionic compound having a Lewis-acid cation or an ionic compound containing a Brönsted acid as cation. The cation-forming compounds are frequently also referred to as compounds which form metallocenium ions.

Suitable cation-forming compounds also include boronaluminum compounds such as di[bis(pentafluorophenylboroxy)]methylalane. Such boron-aluminum compounds are disclosed, for example, in WO 99/06414.

It is also possible to use mixtures of all of the abovementioned cation-forming compounds. Preferred mixtures comprise aluminoxanes, in particular methylaluminoxane, and an ionic compound, in particular one containing the tetrakis(pentafluorophenyl)borate anion, and/or a strong uncharged Lewis acid, in particular tris(pentafluorophenyl)borane.

Preference is given to using both the metallocene compound and the cation-forming compound in a solvent, preferably aromatic hydrocarbons having from 6 to 20 carbon atoms, in particular xylenes and toluene.

The preferred catalyst systems based on metallocene compounds can further comprise, as additional component, a metal organic compound, e.g. n-butyllithium, n-butyl-n-octylmagnesium, n-butyl-n-heptylmagnesium, tri-n-hexylaluminum, triisobutylaluminum, triethyl-aluminum and trimethylaluminum and mixtures thereof.

The preferred catalyst systems based on metallocene compounds are usually used in supported form. Suitable supports are, for example, porous organic or inorganic inert solids such as finely divided polymer powders, talc, sheet silicates or inorganic oxides. Inorganic oxides suitable as supports may be found among the oxides of elements of groups 2, 3, 4, 5, 13, 14, 15 and 16 of the Periodic Table of the Elements. Preference is given to oxides or mixed oxides of the elements calcium, aluminum, silicon, magnesium or titanium and also corresponding oxide mixtures. Other inorganic oxides which can be used alone or in combination with the abovementioned oxidic supports are, for example, $ZrO_2$ or $B_2O_3$. Preferred oxides are silicon dioxide and aluminum oxide, in particular silica gels or pyrogenic silicas. An example of a preferred mixed oxide is calcined hydrotalcite.

The support materials used preferably have a specific surface area in the range from 10 to 1000 $m^2/g$, preferably from 50 to 500 $m^2/g$ and in particular from 200 to 400 $m^2/g$, and a pore volume in the range from 0.1 to 5 ml/g, preferably from 0.5 to 3.5 ml/g and in particular from 0.8 to 3.0 ml/g. The mean particle size of the finely divided supports is generally in the range from 1 to 500 μm, preferably from 5 to 350 μm and in particular from 10 to 100 μm.

EXAMPLES

Preparation of the Catalyst

The supported catalyst was prepared in anology to the method described in WO 00/05277 A1 with dimethylsilanediyl(2-methyl-4-phenyl terahydro-s-indacenyl)(2-isopropyl-4-(4'-tert-butylphenyl)indenyl) zirconium dimethyl as metallocene compound.

Polymerization

The process was carried out in two continuous vertically stirred gas phase reactors which were connected in series and each had a nominal capacity of 25 $m^3$.

Propylene and ethylene were passed in gaseous form into the first polymerization reactor and polymerized at a mean residence time as shown in Table 1 by means of the metallocene catalyst at a pressure and temperature as shown in Table 1. Triisobutylaluminum was added as a cocatalyst.

The propylene copolymer obtained in the first gas-phase reactor was transferred together with still active catalyst constituents into the second gas-phase reactor. There, the propylene-ethylene copolymer was polymerized onto it at a total pressure, a temperature and a mean residence time as shown in Table 1.

To regulate the molar mass, hydrogen was metered into the second reactor as necessary. The proportion of propyleneethylene copolymer formed in the second reactor is given by the difference of amount transferred and amount discharged according to the relationship (output from second reactoroutput from first reactor)/output from second reactor.

TABLE 1

Polymerization conditions

|  | Example 1 |
|---|---|
| Reactor I |  |
| Pressure [bar] | 29 |
| Temperature [° C.] | 70-78 |
| Propylene [t/h] | 4.5-5.5 |
| Catalyst [kg/h] | 1.2-1.8 |
| Triisobutylaluminum [g/t propylene] | 0.2 |
| Hydrogen [g/t propylene] | 0-12 |
| Ethylene [% by volume] | 10-14 |
| Residence time [h] | 1.6-1.9 |
| $C_2$ [% by weight] in powder (IR) | 1.8 |

TABLE 1-continued

Polymerization conditions

|  | Example 1 |
|---|---|
| Powder MFR (230° C./2.16 kg) [g/10 min]/ISO 1133 | 1.0-1.6 |
| Powder output [kg/h] | Ca. 4500 |
| Reactor II |  |
| Pressure [bar] | 14 |
| Temperature [° C.] | 75-78 |
| Propylene [t/h] | 0.4-0.6 |
| Ethylene [% by volume] | 32 |
| Hydrogen [g/t propylene] | 0-5 |
| Residence time [h] | 1.5-1.7 |
| Powder output [kg/h] | Ca 5500 |
| $C_2$ [% by weight] in powder (IR) | 5.1 |
| Powder MFR (230° C./2.16 kg) [g/10 min]/ISO 1133 | 1.3 |
| Content of propylene-ethylene copolymer A [% by weight] | 78 |
| Content of propylene-ethylene copolymer B [% by weight] | 22 |
| Weight ratio of A(I):B(II) | 3.5 |

The polymer powder obtained in the polymerization was metered by a continuous weighing means into the hopper of a twin-screw extruder (ZSK 30 from Werner & Pfleiderer).

The properties of the propylene copolymer composition are shown in Table 2. The data were determined on the propylene copolymer composition after granulation or on test specimens produced therefrom.

TABLE 2

Analytical results on the propylene copolymer composition

|  | Example 1 |
|---|---|
| Proportion of xylene-soluble material [% by weight] | 21 |
| $C_2$ content (IR) [% by weight] | 5.1 |
| $C_2$ content of propylene-ethylene copolymer in reactor II (IR) [% by weight]-calculated | 24.5 |
| MFR (230° C./2.16 kg) [g/10 min]/ISO 1133 | 1.5 |
| DSC melting point [° C.] | 137 |
| Vicat A softening temperature [° C.]/ISO 306 VST/A50 | 126 |
| Flexural modulus [MPa]/ISO 178 | 650 |
| Haze (1 mm*) [%]/ASTM D 1003 | 27.2 |

*Injection-molded plates having a thickness of 1 mm.

Analysis

The production of the test specimens were carried out in accordance with the standards indicated in the Table.

Proportion of Xylene-Soluble Material 2.5 g of polymer and 250 cm³ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm³ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

Comonomer ($C_2$) Content

Determined by IR spectroscopy.

Melt Flow Rate (MFR)

Determined according to ISO 1133 (230° C., 2.16 kg).

DSC Melting Point

The melting points were determined by means of DSC (differential scanning calorimetry). The measurement was carried out in accordance with ISO standard 3146 using a first heating at a heating rate of 20° C. per minute to 200° C., a dynamic crystallization at a cooling rate of 20° C. per minute down to 25° C. and a second heating at a heating rate of 20° C. per minute back to 200° C. The melting point is then the temperature at which the enthalpy vs. temperature curve measured in the second heating displays a maximum.

Vicat A Softening Temperature

Determined according to ISO 306 condition A at a temperature of 50° C.

Flexural Modulus

Determined according to ISO 178.

Haze

Determined according to ASTM D 1003 on 1 mm plaques.

Preparation of Infusion Bottles

The granules are introduced into a blow moulding machine (bottle-fill-seal-system, i.e. bottlepack® machine by rommelag®). A plastic parison, extruded from polymer, is accepted by the opened blow mould and cut below the die of the parison head. The main mould closes and simultaneously seals the bottom. A mandrel unit settles onto the neck area and forms the parison into a container using compressed air or vacuum. By the way of the special mandrel unit, destilled water or other filling solution precisely measured by the dosing unit is filled into the container. After the special mandrel unit retracts, the head mould closes and forms the required seal by vacuum. With the opening of the blow mould, the containers exit from the machine. The containers were sterilized at a temperature of 121° C. for 15 minutes. No post-crystallization was observed. The bottles showed high transparency and were flexible, so that the total content of water could be discharged.

The invention claimed is:

1. An article comprising:
    a propylene polymer composition wherein the propylene polymer composition comprises:
    A) 60%-90%, based upon total weight of the propylene polymer composition, of a crystalline propylene copolymer containing from 1.0% to 5.0 wt. % of ethylene derived units;
    B) 10%-40%, based upon total weight of the propylene polymer composition, of a copolymer of propylene with from 20 to 32 wt. % of ethylene derived units,
    wherein the propylene polymer composition has a melt flow rate between 1.0 and 2.0 g/10 min.

2. The article of claim 1, wherein component A) is a propylene copolymer containing between 1.2% and 3.4% by weight of ethylene derived units and component B) is a copolymer of propylene containing from 22% to 32% by weight of ethylene derived units.

3. The article of claim 1, wherein the composition has a melting point ranging from 130° to 158° C.

4. The article of claim 1, wherein the propylene polymer composition has a flexural modulus between 800 MPa and 450 MPa.

5. The article of claim 1, wherein the article has a haze lower than 40%.

6. The article of claim 1, wherein the propylene polymer composition has been produced in a multi-step process in the presence of a catalyst system comprising a metallocene having two different π-ligands.

7. The article of claim 1, wherein the article is a blow moulded article.

8. The article of claim 1, wherein the article is a bottle.

* * * * *